Figure 3:
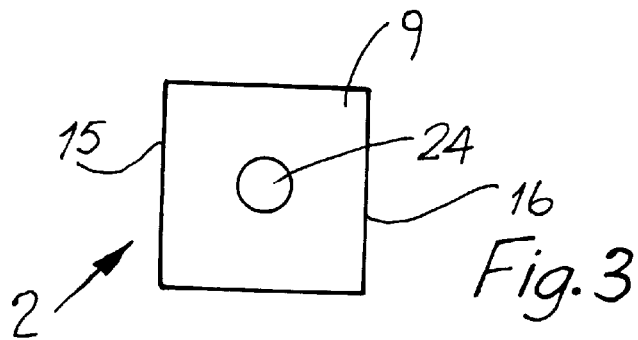

United States Patent [19]
Jansson et al.

[11] Patent Number: 5,904,089
[45] Date of Patent: May 18, 1999

[54] END MOUNTING FOR A RAM HOUSING

[75] Inventors: Claes Erick Jansson, Sacramento, Calif.; Maurice Francis Moynihan, Dublin; Hugo Anthony Van Den Bergh, Enniskerry, both of Ireland; Diarmuid Raymond Meagher, Sacramento, Calif.

[73] Assignee: Oseney Limited, Dublin, Ireland

[21] Appl. No.: 08/860,302

[22] PCT Filed: Dec. 21, 1995

[86] PCT No.: PCT/IE95/00066

§ 371 Date: Aug. 25, 1997

§ 102(e) Date: Aug. 25, 1997

[87] PCT Pub. No.: WO96/19682

PCT Pub. Date: Jun. 27, 1996

[30] Foreign Application Priority Data

Dec. 22, 1994 [IE] Ireland ................................. S940994

[51] Int. Cl.⁶ ........................................................ F01B 15/04
[52] U.S. Cl. ................................. 92/118; 92/161; 16/225; 16/DIG. 13
[58] Field of Search ............................. 92/118, 161, 223; 16/223, 225, DIG. 13

[56] References Cited

U.S. PATENT DOCUMENTS

| | | | |
|---|---|---|---|
| 2,371,553 | 3/1945 | Scott | 92/161 |
| 2,798,688 | 7/1957 | Affleck | 92/161 |
| 3,159,086 | 12/1964 | Schwartz | 92/161 |
| 4,636,065 | 1/1987 | Kanemitsu et al. | 16/225 |
| 4,728,265 | 3/1988 | Cannon | 16/225 |
| 4,744,494 | 5/1988 | Seager et al. | 16/225 |

FOREIGN PATENT DOCUMENTS

| | | |
|---|---|---|
| 0 081 043 | 6/1983 | European Pat. Off. . |
| 964 930 | 12/1956 | Germany . |
| 30 41 878 | 6/1982 | Germany . |
| 372 702 | 12/1963 | Switzerland . |

*Primary Examiner*—F. Daniel Lopez
*Attorney, Agent, or Firm*—Sixbey, Friedman, Leedom & Ferguson; Frank P. Presta; Joseph S. Presta

[57] ABSTRACT

An end mounting (2) for pivotally mounting a housing (5) of a ram (1) to a structure (3) is formed from a single solid piece of material. The end mounting (2) comprises a mounting block (9) which is secured to the structure (3), an end cap (10) which is sealably secured to the housing (5), and a connecting portion (14) which extends between the mounting block (9) and the end cap (10). The connecting portion (14) is of hour-glass shape, cross-section and extends the width of the mounting block (9) to form a plastic hinge. The connection portion (14) defines a pivot axis (18) at the waist (19) of the hour-glass shape about which the end cap (10) and the mounting block (9) are pivotal relative to each other.

18 Claims, 3 Drawing Sheets

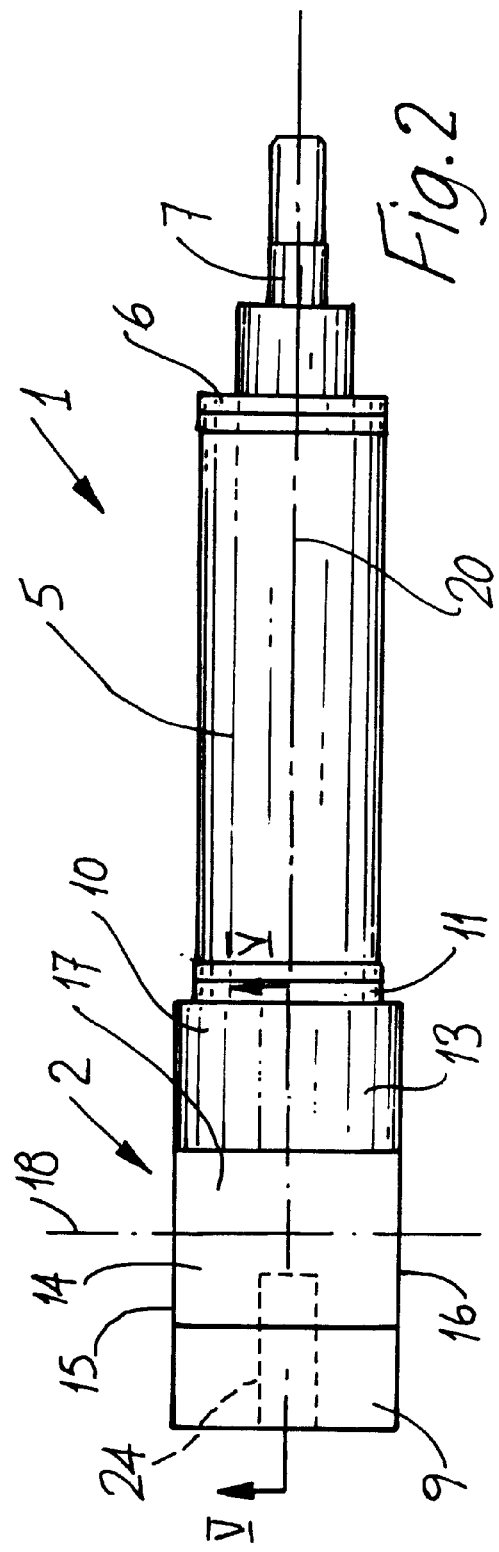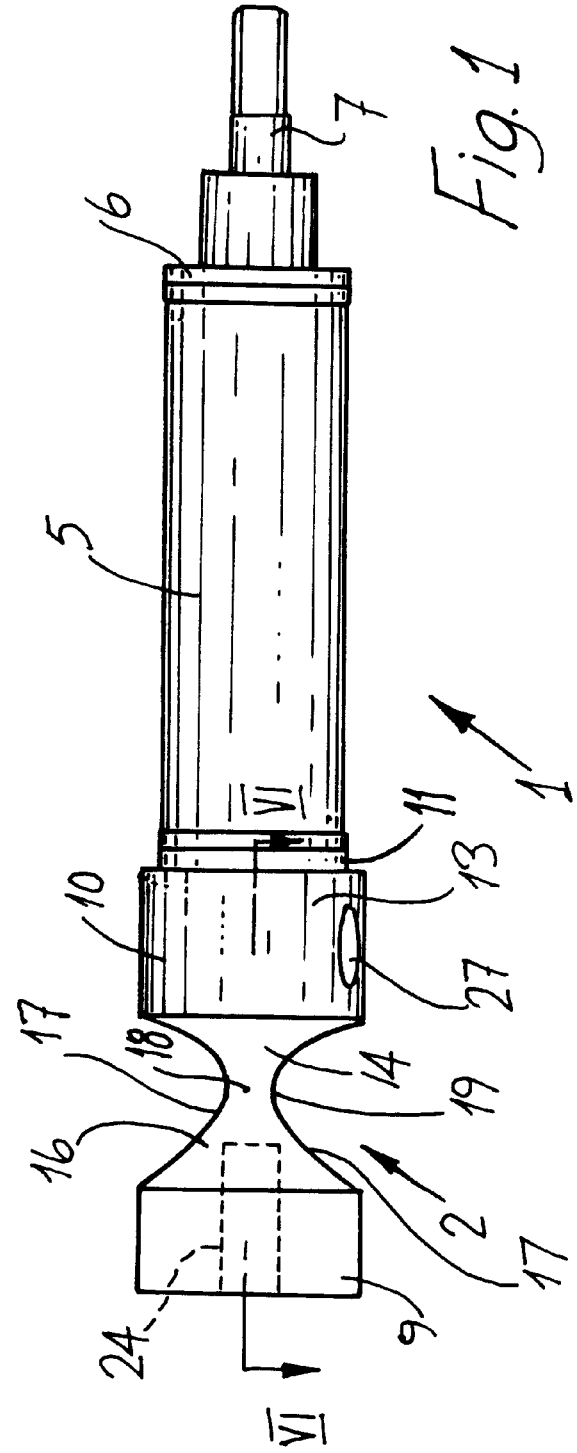

END MOUNTING FOR A RAM HOUSING

The present invention relates to an end mounting for a ram housing, and in particular, though not limited to an end mounting for a pneumatic or hydraulic ram housing.

Pneumatic and hydraulic rams, in general, comprise a housing, which typically, though not necessarily is of cylindrical construction and which is closed at respective opposite ends by end caps. A piston is slidable within the housing from end to end, and carries a piston rod which extends through one of the end caps. As the piston slides from end to end within the housing, the piston rod is extended from and retracted into the housing, respectively. In the case of a single acting ram, a single port is located at one end of the cylinder or in the end cap for delivering pneumatic or hydraulic fluid into the ram for urging the piston from one end to the other. A spring returns the piston. In a double acting ram a pair of ports are provided at respective opposite ends of the cylinder or in the end caps for delivering hydraulic or pneumatic fluid into the cylinder for urging the piston in respective opposite directions. Such rams will be well known to those skilled in the art.

Rams of the type described above have many uses. In general, they are anchored to two components of a structure or mechanism for urging the respective components towards and away from each other, or for pivoting thereof. In general, an end mounting is provided towards one end of the housing for mounting the housing of the ram to one of the components. Typically, the end mounting is secured to the end cap through which the piston rod does not project, in other words, to the closed end cap. The piston rod is connected to the other component. In many cases, it is essential that the housing of the ram should be pivotal relative to the component or structure to which the housing is mounted for facilitating pivoting of the housing relative to the structure as the piston cycles from end to end in the housing. This, in general, is achieved by provided a pivot coupling within the end mounting. Such end mountings, in general, comprise a mounting member which extends from the housing or end cap of the ram, typically, from the end cap. A U-shaped mounting bracket which embraces the mounting member, and which is pivotally connected to the mounting member by a clevis pin is provided for mounting to the component to which the ram housing is to be mounted. The clevis pin facilitates pivotal movement between the mounting bracket and the mounting member, and in turn, between the ram and the structure or component to which it is mounted. Circlips, typically secure the clevis pin in the mounting bracket and the mounting member.

Such end mountings, in general, are adequate for accommodating pivotal movement between a ram and the structure to which the ram is mounted in cases where the pivotal movement of the ram relative to the structure is relatively infrequent, and where the speed of pivotal movement required between the ram and the structure is relatively slow, in other words, where the frequency of cycling of the piston within the ram housing is relatively low, and where the cycle time of the piston within the ram housing is relatively long. However, such end mountings, in general, are inadequate where the piston is to cycle within the ram housing at rates in excess of ten cycles per second, and many cycles are required over the life of ram, for example, over one million cycles.

Additionally, because of the fact that such end mountings require so many components, and the fact that the mounting member and mounting bracket are in pivotal engagement with the clevis pin, wear occurs. Such wear can lead to three serious problems. Firstly, the ram may wobble from side to side relative to the structure to which it is mounted, while pivoting about the clevis pin as a result of play between the clevis pin, the mounting member and the mounting bracket. Secondly, and in many cases, more importantly, as a result of wear components may become detached from the end mounting, typically, the circlip and the clevis pin, and where such rams are used in a production environment, the components may fall into the product being produced. Where the product is a food product, this can have serious consequences. Thirdly, wear increases friction in the pivotal coupling of the end mounting, and this thus leads to inefficiency.

There is therefore a need for an end mounting for mounting a ram housing of the type hereinbefore described to a structure or component which overcomes these problems.

The present invention is directed towards providing such an end mounting, and a ram comprising the end mounting.

According to the invention there is provided an end mounting for a ram housing, the end mounting comprising an engagement means for engaging and securing the end mounting to the ram housing, a mounting means for mounting the ram housing to a structure or other component, a connecting means for pivotally connecting the engagement means and the mounting means, the connecting means defining a pivot axis about which the engagement means and mounting means are pivotal relative to each other for facilitating pivotal movement of the ram housing relative to the structure, wherein the end mounting is a one piece end mounting, the engagement means, the mounting means and the connecting means of the end mounting being integrally formed from a single piece of material, and the connecting means is formed by a connecting portion of the material which is resilient for facilitating pivotal movement between the engagement means and the mounting means.

In one aspect of the invention the engagement means and the mounting means are pivotal relative to each other about the pivot axis in only one pivot plane, the pivot axis extending perpendicularly to the pivot plane.

In another aspect of the invention the connecting portion of the material of the end mounting extends longitudinally along the pivot axis for constraining the pivotal movement of the engagement means and the mounting means in the single pivot plane.

In a further aspect of the invention the connecting portion of the material of the end mounting is shaped to form the resilience of the connecting means for facilitating the pivotal movement between the engagement means and the mounting means.

In another aspect of the invention the connecting portion of the material of the end mounting defines an elongated channel which extends the length of the connecting portion of the material along the pivot axis for providing a weakened area of the material for forming the resilience of the connecting means.

In a further aspect of the invention the connecting portion of the material of the end mounting defines a pair of opposing channels extending along the pivot axis for forming the weakened area of the material.

Preferably, the transverse cross-section of the connecting portion of the material of the end mounting when viewed perpendicularly to the pivot plane is of hour-glass shape.

In one aspect of the invention the length of the connecting portion of the material of the end mounting parallel to the pivot axis is substantially similar to the width of the engagement means and the mounting means parallel to the pivot axis.

Ideally, the connecting means retains the engagement means and the mounting means in an equilibrium position with the resilient biasing forces of the connecting means acting on the engagement means and the mounting means being neutral, and on the engagement means and mounting means being pivoted relative to each other from the equilibrium position, the resilient biasing forces of the connecting means acting on the engagement means and the mounting means being such as to urge the engagement means and the mounting means into the equilibrium position.

In one aspect of the invention the engagement means forms an end cap for engaging the ram housing. Preferably, the end cap sealably closes the ram housing at one end thereof. Advantageously, a port for accommodating fluid into and from the ram housing is provided through the end cap. Preferably, the end cap comprises a circumferentially extending side wall for engaging the ram housing, and the port is located in the side wall.

In a further embodiment of the invention the mounting means comprises a mounting block.

In another aspect of the invention the pivot axis in use is disposed perpendicularly to a central axis defined by the ram housing.

Ideally, the mounting means comprises a fastening means for facilitating mounting of the end mounting to the structure of component, and the mounting means defines a fastening bore which forms the fastening means. In one aspect of the invention the fastening bore is threaded for receiving a screw. Preferably, the fastening bore extends perpendicularly to the pivot axis.

Advantageously, the fastening bore is located in the mounting means so that in use a central axis defined by the fastening bore coincides with the central axis of the ram housing.

In one aspect of the invention the material of the end mounting is a plastics material.

Preferably, the material of the end mounting is of a type suitable for forming a plastics hinge.

Additionally, the invention provides a ram comprising a ram housing and an end mounting according to the invention for mounting the ram to a structure or other component.

Preferably, the ram housing is an elongated housing defining an elongated hollow interior region, and a piston is slidably located in the hollow interior region, the end mounting being secured to one end of the ram housing. Advantageously, a piston rod extending from the piston extends from the ram housing at the end remote from the end at which the end mounting is located.

The advantages of the invention are many. A particularly important advantage of the invention is that since the end mounting is formed as a one piece end mounting from a single piece of material, there are thus, no components of the end mounting which can become detached from the end mounting, leading to serious consequential problems, as for example, which can arise in the food industry, should a component of a piece of mechanical apparatus fall into the food material. Additionally, by virtue of the fact that the end mounting is a one piece end mounting formed from a single piece of material, there are no moving parts in the end mounting, for example, there are no moving parts with bearing surfaces which move relative to each other. Thus, frictional forces associated with end mountings which comprise a plurality of moving parts with bearing surfaces which move relative to each other are absent in the end mounting of the present invention. Additionally, by virtue of the fact that the end mounting according to the invention does not comprise components with bearing surfaces which move relative to each other, the end mounting according to the invention is not susceptible to wear. Thus, the problem whereby frictional forces which increase in conventional end mountings due to wear does not arise in the case of the end mounting of the present invention.

In the embodiments of the invention where the connecting portion of the material of the end mounting which forms the connecting means extends for a reasonable length along the pivot axis, the connecting means is relatively rigid in all planes except in the pivot plane. Thus, the engagement means and the mounting means are restrained to pivot in the pivot plane only. Pivoting in any other plane is prevented by the fact that the connecting portion extends for a reasonable length along the pivot axis. This has a particularly important advantage in that there is no danger of the engagement means and the mounting means wobbling relative to each other in planes other than the pivot plane. This has been a particular problem in end mountings known heretofore, particularly, where the bearing surfaces of the components of conventional end mountings commence to wear. Thus, by eliminating wobble, the ram to which the end mounting is connected can be operated with a high degree of accuracy.

Additionally, since the end mounting is a one piece end mounting, construction of the end mounting is a relatively simple and straightforward operation, and it is also relatively inexpensive. In embodiments of the invention where the engagement means also forms an end cap of the ram, a further advantage is achieved in that production and assembly of a ram with the end mounting is considerably simplified, and inexpensive. Furthermore, in such cases, the mounting of the end mounting to the ram can be achieved with the end mounting being relatively accurately located on the ram, and in general, more accurately located than in the case of end mountings of the type known heretofore. Another advantage of the invention is achieved where the connecting means retains the engagement means and the mounting means in an equilibrium position with the resilient forces of the connecting means which act on the mounting means and the engagement means being neutral, and when the engagement means and the mounting means are pivoted relative to each other from the equilibrium position the resilient forces of the connecting means act to return the engagement means and the mounting means to the equilibrium position. The advantage of this feature of the invention is that the ram mounted to the engagement means is urged to return to an equilibrium position each time the ram pivots from the equilibrium position. This, thus, facilitates quick return of the ram to the equilibrium position from either side of the equilibrium position, and it will be appreciated that the further the ram is pivoted about the pivot axis of the connecting means from the equilibrium position, the greater will be the resilient forces of the connecting means acting on the engagement means and the mounting means for returning the ram to the equilibrium position. This thus further facilitates quick return of the ram to the equilibrium position.

Furthermore, by virtue of the fact that the connecting means is resilient, shocks and impacts caused by the piston moving within the ram housing are largely absorbed by the end mounting, and in general, are not transmitted to the structure on which the end mounting is mounted. This, as well as minimizing the transmission of such shocks and impacts, also reduces the noise level of operation of the ram.

By providing the end mounting of a plastics material, a relatively inexpensive end mounting which is relatively easy to machine, mould or otherwise produce and which has a relatively long life is provided. It has been found that by forming the end mounting from a resilient plastics material which is suitable for forming a plastics hinge, the end mounting is capable of accommodating three million pivoting cycles, in other words, the end mounting is capable of facilitating three million pivoting cycles between the engagement means and the mounting means, and furthermore, the end mounting is capable of facilitating thirty pivoting cycles per second, in other words, thirty pivoting cycles of the engagement means and the mounting means relative to each other.

Figure 4:
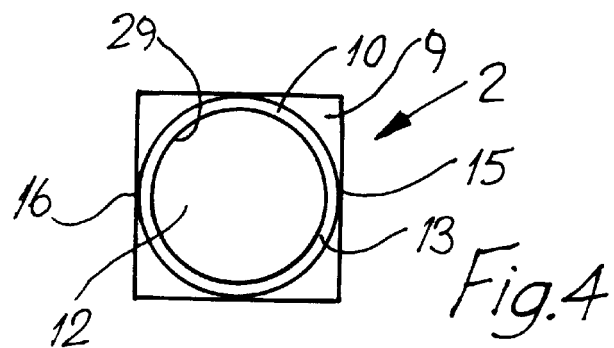
Figure 5:
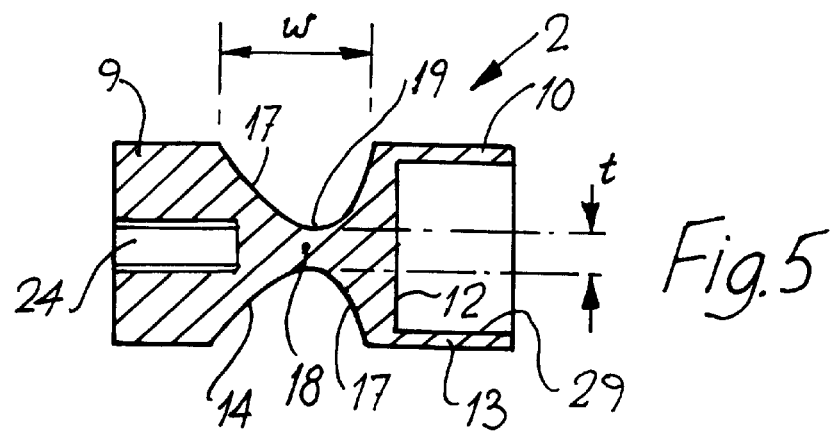
Figure 6:
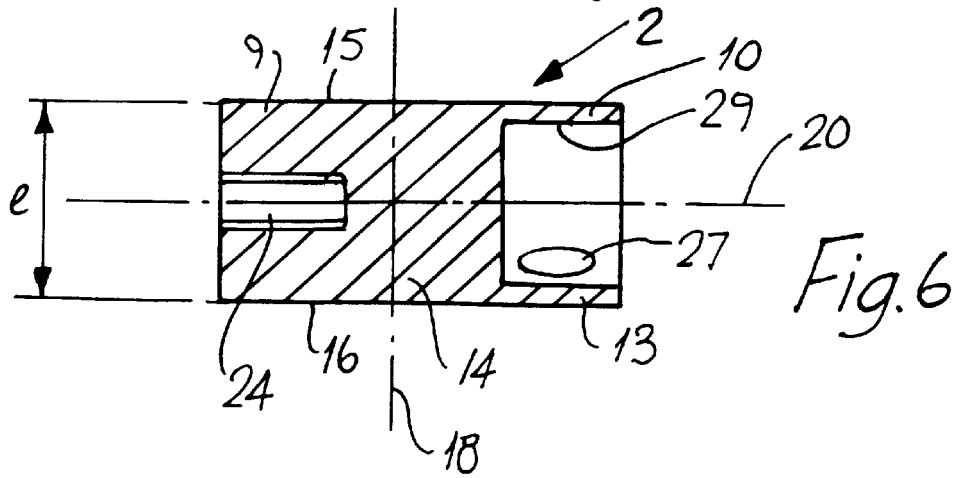

The invention will be more clearly understood from the following description of a preferred embodiment thereof which is given by way of example only with reference to the accompanying drawings, in which:

FIG. 1 is a side elevational view of a ram according to the invention comprising an end mounting also according to the invention, FIG. 2 is a plan view of the ram and end mounting of FIG. 1, FIG. 3 is an end view of the end mounting of FIG. 1 from one end, FIG. 4 is an end view of the end mounting of FIG. 1 from the other end to that of FIG. 3, FIG. 5 is a sectional side elevational view of the end mounting on the line V—V of FIG. 2, FIG. 6 is a sectional plan view of the end mounting on the line VI—VI of FIG. 1, and FIGS. 7(a) and 7(b) are side elevational views of the ram and end mounting of FIG. 1 illustrated in different positions.

Figure 7:
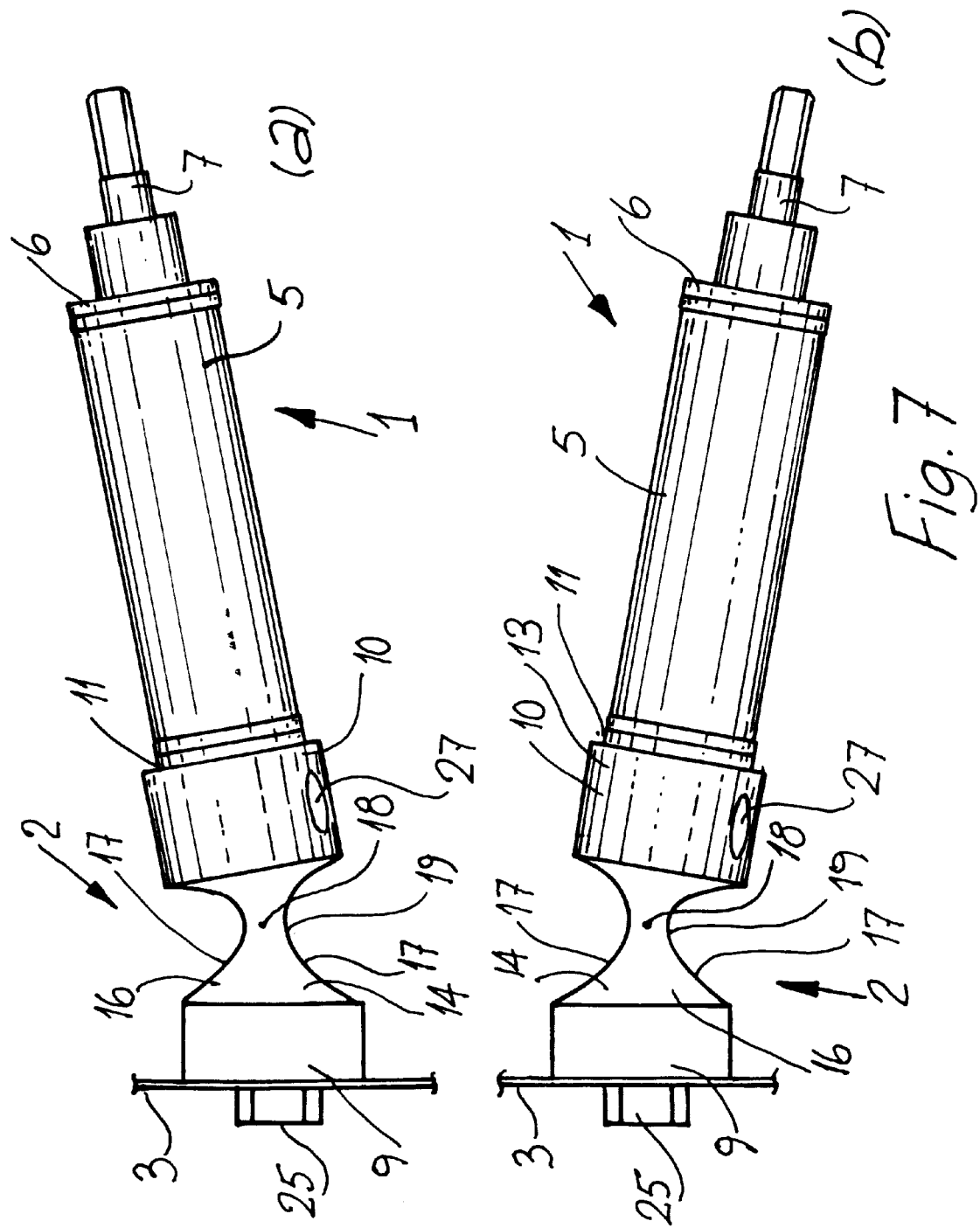

Referring to the drawings there is illustrated a single acting pneumatic ram according to the invention indicated generally by the reference numeral 1 which comprises an end mounting, also according to the invention and indicated generally by the reference numeral 2 for pivotally mounting the ram 1 to a structure 3 or other component, see FIG. 7. The ram 1 comprises an elongated cylindrical housing 5 which is closed at one end by an end cap 6. A piston (not shown) is slidable within the housing 5, and a piston rod 7 connected to the piston (not shown) extends from the cylindrical housing 5 through the end cap 6. Slidable movement of the piston within the housing 5 causes the piston rod 7 to extend from and retract into the housing 5. The operation of such rams will be well known to those skilled in the art.

The end mounting 2 is a one piece end mounting and is integrally formed from one single solid piece of material, which in this case, is a resilient plastics material of the type suitable for forming a plastics hinge. The end mounting 2 comprises a mounting means, namely, a mounting block 9 of square shape in end view for engaging and mounting the ram 1 to the structure 3 as will be described below. An engagement means for engaging the housing 5 of the ram 1 and for mounting the end mounting on the ram 1, in this case, is formed in the shape of a circular end cap 10 for securely engaging and closing an end 11 of the housing 5 opposite to the end which carries the end cap 6. The end cap 10 comprises a base 12 which is formed by the material of the end mounting 2 and a cylindrical side wall 13 for sealably engaging the housing 5 of the ram 1.

A connecting means for pivotally connecting the mounting block 9 and the end cap 10 together comprises a connecting portion 14 which is formed from the same single piece of material which forms the mounting block 9 and the end cap 10, and extends between the mounting block 9 and the end cap 10. The connecting portion 14 is shaped to form a resilient plastics hinge for facilitating pivotal movement between the end cap 10 and the mounting block 9, for in turn facilitating pivotal movement between the ram 1 and the structure 3. The connecting portion 14 extends the width of the end mounting 2 from one side 15 to the other side 16 of the end mounting 2. In other words, the connecting portion 14 extends the width of the mounting block 9, and the width of the diameter of the end cap 10 in plan view. The connecting portion 14 defines a pair of opposed elongated channels 17, also extending the width of the mounting block 9, in other words, the channels 17 extend the width of the connecting portion 14. Thus, the connecting portion 14 is of constant cross-section of hour-glass shape along its length from the side 15 to the side 16, and defines a pivot axis 18 adjacent a waist 19 of the hour-glass shape about which the end cap 10 and the mounting block 9 are pivotal in a single pivot plane 20. The pivot axis 18 extends parallel to the waist 19 and the channels 17, and perpendicularly to the pivot plane 20.

By virtue of the fact that the connecting portion 14 extends the width of the end mounting 2 along the pivot axis 18, the connecting portion 14 provides rigidity between the end cap 10 and the mounting block 9 in all planes except the pivot plane 20. Thus, the connecting portion 14 facilitates pivoting of the end cap 10 relative to the mounting block 9 about the pivot axis 18 in the pivot plane 20, but constrains the end cap 10 and the mounting block 9 to pivot only in the pivot plane 20. Thereby, the possibility of wobble between the end cap 10 and the mounting block 9 from side to side on either side of the pivot plane 20 is effectively eliminated.

The resilience of the connecting portion 14 is such that the connecting portion 14 retains the end cap 10 and the mounting block 9 in an equilibrium position illustrated in FIGS. 1 and 2. In this position, the resilient biasing forces of the connecting portion 14 acting on the end cap 10 and the mounting block 9 are neutral. However, on the end cap 10 and the mounting block 9 being pivoted relative to each other from the equilibrium position, the resilient biasing forces in the connecting portion 14 act on the end cap 10 and the mounting block 9 to urge and return the end cap 10 and the mounting block 9 to their equilibrium position. The resilient forces in the connecting portion 14 are such that the resilient forces urging the end cap 10 and the mounting block 9 back to their equilibrium position increase the further the end cap 10 and the mounting block 9 are moved from the equilibrium position. This thus ensures quick return of the end cap 10 and the mounting block 9 to the equilibrium position, when an external force which has urged the end cap 10 and the mounting block 9 out of their equilibrium position has been removed. Accordingly, the end mounting 2 retains the ram 1 in a equilibrium position relative to the structure 3, when the end cap 10 and the mounting block 9 are in their equilibrium position. Thus, on the ram 1 being pivoted from the equilibrium position about the pivot axis 18 of the end mounting 2 as a result of the movement of the piston rod 7 relative to the housing 5, on the piston rod 7 being returned to a position which corresponds to the equilibrium position of the ram 1 and the structure 3, the action of the connecting portion 14 on the end cap 10 and the mounting block 9 rapidly assists the return of the ram 1 to its equilibrium position relative to the structure 3.

A fastening means provided by a threaded bore 24 extends into the mounting block 9 for accommodating a screw 25, for securing the mounting block 9 to the structure 3, see FIG. 7. A fluid port 27 is provided through the side wall 13 of the end cap 10 for accommodating pneumatic fluid into and out of the housing 5. A corresponding opening (not shown) is formed in the housing 5 of the ram 1 and is aligned with the fluid port 27 for accommodating pneumatic fluid into the housing 5. Typically, a bore 29 formed by the side wall 13 of the end cap 10 may be threaded for tightly and sealably engaging corresponding threads (not shown) on the housing 5 for securing the end cap 10 to the housing 5.

The dimensions of the end mounting 2 will vary depending on the size, weight and other parameters of the ram 1, and in particular, the length l, the width w, and the thickness t of the connecting portion 14, see FIGS. 5 and 6, will vary. However, in this embodiment of the invention the ram 1 comprises a housing 5 of 19 mm diameter. The length l of the connecting portion 14 is 25 mm. The width w of the connecting portion 14 is 20 mm, and the thickness t of the connecting portion at the waist 19 is 4.8 mm. These dimensions are solely given for the purpose of illustration, and in no way are intended to limit the scope of the invention.

In use, the end mounting 2 is secured to the housing 5 of the ram 1 by engaging the housing 5 in the bore 29 of the end cap 6. Any suitable sealable securing means for securing the housing 5 in the end cap 6 may be used, as discussed above, the bore 29 may be threaded for engaging corresponding threads (not shown ) on the housing 5. The ram 1 is mounted on the structure 3 by securing the mounting block 9 to the structure 3 by the screw 25. The ram 1 and the end mounting 2 are oriented so that the pivot axis 18 is aligned with the axis about which the ram 1 is to pivot and the screw 25 is then securely tightened in the mounting block 9. The piston rod 7 is secured to a linkage or other component (not shown) which is to be operated by the piston rod 7. As the ram 1 is operated and the piston rod 7 extends from and is retracted into the housing 5, the ram 1 pivots relative to the structure 3 about the pivot axis 18 of the end mounting 2. As discussed above the resilient forces of the connecting portion 14 which act on the mounting block 9 and the end cap 6 when the mounting block 9 and the end cap 10 are pivoted from their equilibrium position, act to return the ram 1 to its equilibrium position as the ram 1 is moved therefrom. In FIG. 7(*a*) the ram 1 is illustrated having pivoted to one extreme position about the pivot axis 18 in the pivot plane 20, while in FIG. 7(*b*) the ram 1 is illustrated having pivoted to the opposite extreme position in the pivot plane 20 about the pivot axis 18.

While the mounting means has been described as being a mounting block and the engagement means has been described as being an end cap, the mounting means and engagement means may be provided in other shapes, forms and constructions. It is not essential although, it is preferable, that the engagement means should form an end cap of the ram.

While a particular shape of connecting portion of the end mounting has been described, the connecting portion may be of other suitable shapes. While it is preferable that the connecting portion should extend longitudinally along the pivot axis for a reasonable distance to avoid sideward wobbling, it is not essential that the connecting portion should extend the full width of the mounting block and/or the end cap. In certain cases, should it be desired that the connecting portion facilitate pivoting of the engagement means relative to the mounting means about more than one axis, for example, it may be desirable that the mounting means and the engagement means be pivotal about two axes at right angles to each other, in such a case, the connecting means would be suitably shaped, and for example, may be of hour-glass shape when viewed both in side elevation and in plan view. It is also envisaged that the connecting means may be arranged for pivoting the mounting means and the engagement means universally relative to each other.

While the material of the end mounting has been described as being a resilient plastics material, any other suitable material may be used, provided it is a resilient material and capable of accommodating many pivoting cycles, or provided the material of the end mounting can be shaped at the connecting means for forming a resilient connecting portion.

We claim:

1. A ram comprising an end mounting (2) and a ram housing (5), the end mounting (2) comprising an engagement means (10) for engaging and securing the end mounting (2) to the ram housing (5), a mounting means (9) for mounting the ram housing (5) to a structure (3), a connecting means (14) for pivotally connecting the engagement means (10) and the mounting means (9), the connecting means (14) defining a single pivot axis (18) about which the engagement means (10) and mounting means (9) are pivotal relative to each other for facilitating pivotal movement of the ram housing (5) relative to the structure (3), characterized in that the engagement means (10) and the mounting means (9) are pivotal relative to each other about the pivot axis (18) in only one pivot plane (20), the pivot axis (18) extending perpendicularly to the pivot plane (20) and the end mounting (2) is a one piece end mounting (2), the engagement means (10), the mounting means (9) and the connecting means (14) of the end mounting (2) being integrally formed from a single piece of material, and the connecting means (14) is formed by a connecting portion (14) of the material which is resilient for facilitating pivotal movement between the engagement means (10) and the mounting means (9).

2. A ram mounting as claimed in claim 1 characterised in that the connecting portion (14) of the material of the end mounting (2) extends longitudinally along the pivot axis (18) for constraining the pivotal movement of the engagement means (10) and the mounting means (9) in the single pivot plane (20).

3. A ram mounting as claimed in claim 1 characterised in that the connecting portion (14) of the material of the end mounting (2) is shaped to form the resilience of the connecting means (14) for facilitating the pivotal movement between the engagement means (10) and the mounting means (9).

4. A ram mounting as claimed in claim 3 characterised in that the connecting portion (14) of the material of the end mounting (2) defines an elongated channel (17) which extends the length of the connecting portion of the material along the pivot axis (18) for providing a weakened area of the material for forming the resilience of the connecting means (14).

5. A ram mounting as claimed in claim 4 characterised in that the connecting portion (14) of the material of the end mounting (2) defines a pair of opposing channels (17) extending along the 10 pivot axis (18) for forming the weakened area of the material.

6. A ram mounting as claimed in claim 3 characterised in that the transverse cross-section of the connecting portion (14) of the material of the end mounting (2) when viewed perpendicularly to the pivot plane (20) is of hour-glass shape.

7. A ram mounting as claimed in claim 1 characterised in that the length of the connecting portion (14) of the material of the end mounting (2) parallel to the pivot axis (18) is substantially similar to the width of the engagement means (10) and the mounting means (9) parallel to the pivot axis (18).

8. A ram mounting as claimed in claim 1 characterized in that the connecting means (14) retains the engagement means (10) and the mounting means (9) in an equilibrium position with a resilient biasing force of the connecting means (14) acting on the engagement means (10) and the mounting means (9) being neutral, and on the engagement means (10) and mounting means (9) being pivoted relative to each other from the equilibrium position, the resilient biasing force of the connecting means (14) acting on the engagement means (10) and the mounting means (9) being such as to urge the engagement means (10) and the mounting means (9) into the equilibrium position.

9. A ram mounting as claimed in claim 1 characterized in that the engagement means (10) forms an end cap (10) for engaging the ram housing (5), and the end cap (10) sealably closes the ram housing (5) at one end (11) thereof.

10. A ram mounting as claimed in claim 9 characterised in that a port (27) for accommodating fluid into and from the ram housing (5) is provided through the end cap (10).

11. A ram mounting as claimed in claim 10 characterised in that the end cap (10) comprises a circumferentially extending side wall (13) for engaging the ram housing (5), and the port (2) is located in the side wall (13).

12. A ram mounting as claimed in claim 1 characterised in that the mounting means (9) comprises a mounting block (9).

13. A ram mounting as claimed in claim 1 characterised in that the pivot axis (18) in use is disposed perpendicularly to a central axis defined by the ram housing (5).

14. A ram mounting as claimed in claim 1 characterized in that the mounting means (9) comprises a fastening means (24, 25) for facilitating mounting of the end mounting (2) to the structure (3).

15. A ram mounting as claimed in claim 14 characterized in that the mounting means (9) defines a fastening bore (24) which forms the fastening means (24, 25), and the fastening bore (24) is threaded for receiving a screw (25), and the fastening bore (24) extends perpendicularly to the pivot axis (18).

16. A ram mounting as claimed in claims 14 characterised in that the fastening bore (24) is located in the mounting means (9) so that in use a central axis defined by the fastening bore (24) coincides with the central axis of the ram housing (5).

17. A ram as claimed in claim 1 characterised in that the material of the end mounting (2) is a plastics material, and is of a type suitable for forming a plastics hinge.

18. A ram as claimed in claim 1 characterised in that the ram housing (5) is an elongated housing (5) defining an elongated hollow interior region, and a piston is slidably located in the hollow interior region, the end mounting (2) being secured to one end (11) of the ram housing (5), and a piston rod (7) extending from the piston extends from the ram housing (5) at the end remote from the end (11) at which the end mounting (2) is located.

* * * * *